United States Patent [19]

Akahori et al.

[11] Patent Number: 5,359,040

[45] Date of Patent: Oct. 25, 1994

[54] MONOAZO COMPOUNDS HAVING NAPHTHYLAZONAPHTYLAMINO GROUP AND USE THEREFOR FOR DYEING OR PRINTING FIBER MATERIALS

[75] Inventors: Kingo Akahori, Toyonaka; Masayuki Miki, Ashiya; Takeshi Washimi, Toyonaka; Yutaka Kayane, Ikoma, all of Japan

[73] Assignee: Sumitomo Chemical Company, Limited, Osaka, Japan

[21] Appl. No.: 963,553

[22] Filed: Oct. 20, 1992

[30] Foreign Application Priority Data

Oct. 24, 1991 [JP] Japan .................. 3-277690

[51] Int. Cl.$^5$ .................. C09B 62/51; D06P 1/384
[52] U.S. Cl. .................. 534/635; 534/638; 534/642
[58] Field of Search .................. 534/642, 635, 638

[56] References Cited

U.S. PATENT DOCUMENTS

| | | | |
|---|---|---|---|
| 3,261,826 | 7/1966 | Andrew et al. | 534/638 X |
| 4,341,699 | 7/1982 | Tezuka et al. | 534/642 X |
| 4,578,457 | 3/1986 | Seiler | 534/632 |
| 4,902,786 | 2/1990 | Springer et al. | 534/642 X |
| 4,988,803 | 1/1991 | Stohr et al. | 534/638 X |
| 5,116,959 | 5/1992 | Morimitsu et al. | 534/638 X |
| 5,136,028 | 8/1992 | Seiler | 534/638 X |
| 5,235,046 | 8/1993 | Akahori et al. | 534/642 |

FOREIGN PATENT DOCUMENTS

| | | |
|---|---|---|
| 0076782 | 4/1983 | European Pat. Off. . |
| 0268980 | 6/1988 | European Pat. Off. . |
| 1213940 | 4/1966 | Fed. Rep. of Germany ...... 534/638 |
| 40-17113 | 8/1965 | Japan . |
| 46-824 | 1/1971 | Japan .................. 534/642 |
| 50-178 | 1/1975 | Japan . |
| 59-179665 | 10/1984 | Japan . |
| 60-260654 | 12/1985 | Japan .................. 534/638 |

*Primary Examiner*—Patricia L. Morris
*Assistant Examiner*—Fiona T. Powers
*Attorney, Agent, or Firm*—Stevens, Davis, Miller & Mosher

[57] ABSTRACT

A monoazo compound represented by the following formula (I) in the free acid form:

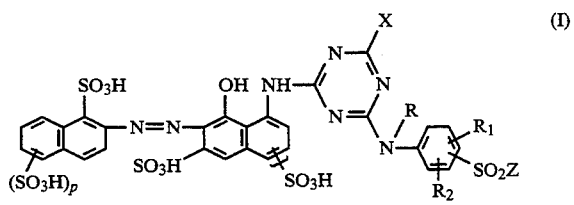

wherein X is an alkylamino, $C_5$–$C_7$ cycloalkylamino, piperidino, pyrrolidino or morpholino group which is unsubstituted or substituted with a substituent other than sulfo, R is hydrogen or unsubstituted or substituted $C_1$–$C_4$ alkyl, $R_1$ and $R_2$ independently of one another are each hydrogen, methoxy, ethoxy, methyl, ethyl, chloro, bromo, nitro, carboxy or sulfo, Z is vinyl or $-CH_2CH_2Y$ in which Y is a group which is split by the action of an alkali and p is 0 or 1. This compound is a reactive dye suitable for dyeing or printing fiber materials containing hydroxyl group and/or amide group in red color. This compound is high in dissolvability and can give dyed or printed products excellent in dyeability such as build-up property and various fastnesses.

8 Claims, No Drawings

MONOAZO COMPOUNDS HAVING NAPHTHYLAZONAPHTYLAMINO GROUP AND USE THEREFOR FOR DYEING OR PRINTING FIBER MATERIALS

The present invention relates to improved compounds which are suitable for use in dyeing and printing materials containing hydroxyl group and/or amide group, particularly those such as cellulose fibers, natural and synthetic polyamide fibers, polyurethane fibers and leathers and further mixed fibers thereof, to obtain dyed or printed products of red color fast to light and wetness, and applications of the compounds.

Monoazo compounds having vinyl sulfone reactive group and capable of dyeing celluloses in red color are known as disclosed in Japanese Patent Kokoku No. 40-17113 and Japanese Patent Kokai No. 59-179665. However, they are yet insufficient in dye performances such as build-up property, and further improvement has been demanded.

Hitherto, various reactive dyes have been widely used in the field of dyeing or printing of fiber materials. However, the present technical standard cannot be said to be satisfactory in view of the high requirement on suitability for specific dyeing methods and enhancement of requirement on fastness of dyed products.

The above-mentioned known reactive dyes are insufficient in dye performances such as build-up property and further improved dyes have been desired.

Superior build-up property is very important today when level of requirement for economics in dyeing method is increasingly raised. The inventors have conducted extensive studies in an attempt to improve the defects of the known dyes and to find novel compounds which can sufficiently satisfy the requirements demanded for dyes and as a result, accomplished the present invention.

The present invention provides monoazo compounds represented by the following formula (I) in the free acid form:

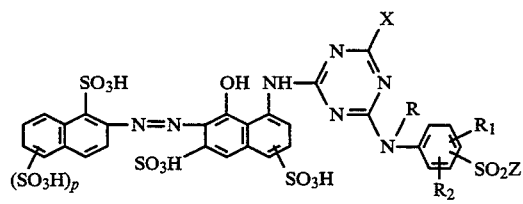

wherein X is an alkylamino, $C_5$-$C_7$ cycloalkylamino, piperidino, pyrrolidino or morpholino group which is unsubstituted or substituted with a substituent other than sulfo, R is hydrogen or unsubstituted or substituted $C_1$-$C_4$ alkyl, $R_1$ and $R_2$ independently of one another are each hydrogen, methoxy, ethoxy, methyl, ethyl, chloro, bromo, nitro, carboxy or sulfo, Z is vinyl or —$CH_2CH_2Y$ in which Y is a group which is split by the action of an alkali and p is 0 or 1.

The present invention further provides a process for producing said monoazo compounds and a method for dyeing or printing fiber materials which comprises using said monoazo compounds.

Among the monoazo compounds of the present invention represented by the formula (I), preferred are those represented by the following formula (II) in the free acid form:

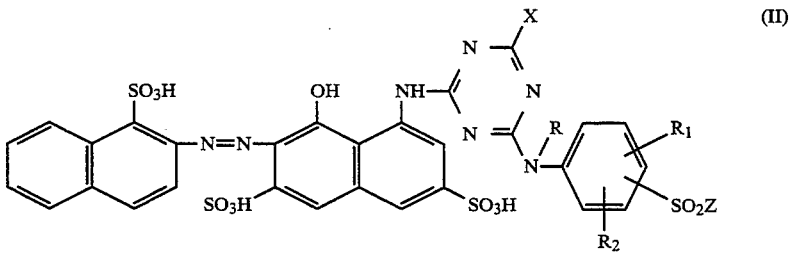

wherein X, R, $R_1$, $R_2$ and Z are as defined above.

As the alkylamino which is represented by X and is unsubstituted or substituted with a substituent other than sulfo, alkylamino having 1–4 carbon atoms is preferable and as the substituent, hydroxy, $C_1$-$C_4$ alkoxy, chloro, bromo and carboxy are preferable.

As preferable X, mention may be made of, for example, ethylamino, n-propylamino, isopropylamino, n-butylamino, diethylamino, 2-hydroxyethylamino, 3-hydroxypropylamino, 4-hydroxybutylamino, 2-methoxyethylamino, 2-ethoxyethylamino, 3-methoxypropylamino, 3-ethoxypropylamino, 2-chloroethylamino, 2-bromoethylamino, 3-chloropropylamino, 3-bromopropylamino, carboxymethylamino, 2-carboxyethylamino, 3-carboxypropylamino, cyclopentylamino, cyclohexylamino, pyrrolidino, piperidino and morpholino, among which piperidino or morpholino is preferred and morpholino is especially preferred.

The group which is split by the action of an alkali includes, for example, sulfuric ester, thiosulfuric ester, phosphoric ester, acetic ester, halogen and the like. Among them, sulfuric ester is preferred.

As the unsubstituted or substituted alkyl represented by R, alkyls having 1–4 carbon atoms are preferred and as the substituent, preferred are hydroxy, cyano, alkoxy, halogen, carbamoyl, carboxy, alkoxycarbonyl, alkylcarbonyloxy, sulfo and sulfamoyl.

As preferable R, mention may be made of, for example, hydrogen, methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxymethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4- methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. Among them, hydrogen, methyl or ethyl are preferred and hydrogen is especially preferred.

$R_1$ and $R_2$ independently of one another are preferably hydrogen, methoxy or methyl and especially preferably hydrogen.

Furthermore, $-SO_2Z$ preferably bonds in m- or p-position in respect to

group and especially preferably bonds in m-position.

The compound of the present invention may be in the form of a free acid or a salt thereof, preferably in the form of an alkali metal salt or an alkaline earth metal salt, especially preferably in the form of sodium salt, potassium salt and lithium salt.

The compound of the present invention can be produced by using, as starting materials, 2,4,6-trihalogeno-s-triazine, a diazotized compound of an amine component represented by the following formula (III):

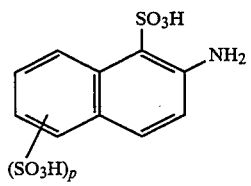

wherein p is as defined above, a compound represented by the following formula (IV):

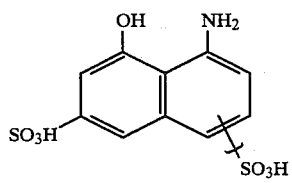

a compound represented by the following formula (V):

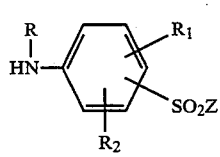

wherein R, $R_1$, $R_2$ and Z are as defined above, and a compound represented by the following formula (VI):

H—X     (VI)

wherein X is as defined above, and reacting them in optional sequence, but in a manner such that the monoazo compound of the above formula (I) is prepared. For example, the diazotized compound of the amine component represented by the formula (III) is used to react with the compound represented by the formula (IV) or its residue. In the above formulae, respective starting compounds are represented in the free acid form when having an acidic group such as sulfo, but they of course include salts thereof, and the same interpretation is also applied to the following description.

In detail, the monoazo compound of the formula (I) or a salt thereof can be produced, for example, by subjecting a compound represented by the following formula (VII):

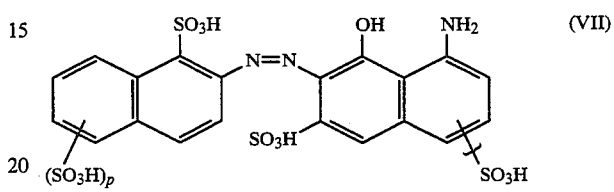

wherein p is as defined above, the compound represented by the following formula (V) and the compound represented by the formula (VI) to a condensation reaction, in optional sequence, with 2,4,6-trihalogeno-s-triazine. The compound of the above formula (VII), the chromophore in the present invention, can be obtained by the coupling reaction of the diazotized compound of the amine component represented by the formula (III) with the coupler component represented by the formula (IV).

The compound of the present invention can also be produced by the following process. That is, the compound represented by the above formula (IV), the compound represented by the above formula (V) and the compound represented by the above formula (VI) are condensed, in optional sequence, with 2,4,6-trihalogeno-s-triazine to obtain the compound represented by the following formula (VIII):

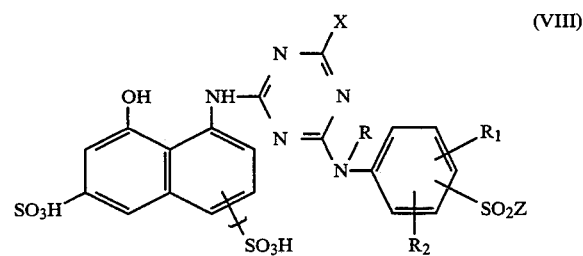

wherein X, R, $R_1$, $R_2$ and Z are as defined above, and the diazotized compound of the amine component represented by the above formula (III) is subjected to a coupling reaction with the compound represented by the above formula (VIII) to obtain the compound of the formula (I) or a salt thereof.

Moreover, the compound of the present invention can also be produced by the following process. The compound represented by the above formula (IV) and either the compound represented by the above formula (V) or (VI) are condensed with 2,4,6-trihalogeno-s-triazine in optional sequence to obtain a compound represented by the following formula (IX):

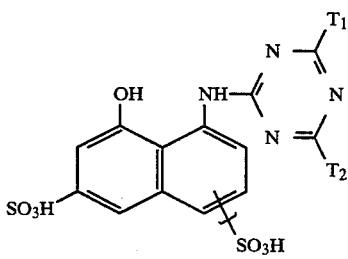

(IX)

wherein $T_1$ is halogeno and $T_2$ is a group represented by X as defined above or a group represented by the following formula (X):

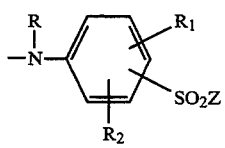

(X)

wherein R, $R_1$, $R_2$ and Z are as defined above, then the diazotized compound of the amine component represented by the above formula (III) is subjected to a coupling reaction with the compound represented by the above formula (IX), followed by further condensation with the compound represented by the formula (V) in case of $T_2$ being X as defined above or with the compound represented by the formula (VI) in case of $T_2$ being represented by the above formula (X) whereby the monoazo compound represented by the formula (I) can be obtained.

Furthermore, the compound of the present invention can also be produced by the following process. 2,4,6-Trihalogeno-s-triazine is first condensed with the compound represented by the above formula (IV), and the diazotized compound of the amine component represented by the above formula (III) is coupled with the condensation product between the 2,4,6-trihalogeno-s-triazine and the compound of the formula (IV) to obtain a dihalogeno-s-triazine compound represented by the following formula (XI):

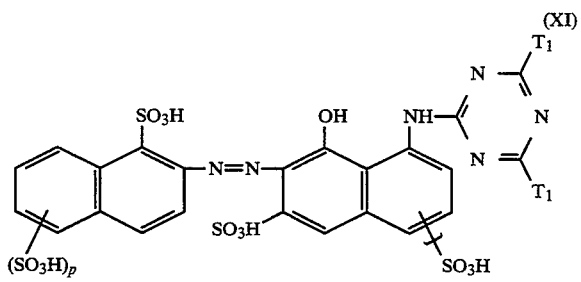

(XI)

wherein p is as defined above and $T_1$ is halogeno. The resulting dihalogeno-s-triazine compound is then further condensed with the compound represented by the above formula (V) and the compound represented by the above formula (VI) in optional sequence whereby the compound represented by the formula (I) is obtained.

The condensation reactions of 2,4,6-trihalogeno-s-triazine with the amine compounds represented by the formula (IV) or (VII), the formula (V) and the formula (VI), respectively, are not limitative in their sequence, but it is preferred that the amine compound lower in reactivity with 2,4,6-trihalogeno-s-triazine is preferentially reacted considering reaction yield and quality of the compound represented by the formula (I).

Conditions of the condensation reaction are not critical, but the compounds of the formula (I) or salts thereof can be obtained by carrying out condensations with adjusting primarily to a temperature of $-10°$ to $40°$ C. and a pH of 2 to 10, secondarily to a temperature of $0°$ to $70°$ C. and a pH of 2 to 10, and thirdly to a temperature of $10°$ to $100°$ C. and a pH of 2 to 10.

Cyanuric chloride and cyanuric fluoride are especially preferred as the starting material 2,4,6-trihalogeno-s-triazines.

The compounds represented by the formula (III) include, for example, 2-aminonaphthalene-1-sulfonic acid, 2-aminonaphthalene-1,5-disulfonic acid, 2-aminonaphthalene-1,6-disulfonic acid and 2-aminonaphthalene-1,7-disulfonic acid. Among them, 2-aminonaphthalene-1-sulfonic acid is preferred.

The compound of the present invention has a fiber-reactivity and can be used for dyeing or printing a hydroxy group- or carbonamide group-containing material. Preferably, the material to be dyed or printed is in the form of a fiber material or a mixed fiber material thereof.

The hydroxy group-containing material includes natural and synthetic hydroxy group-containing materials such as cellulose fiber materials, their regenerated products and polyvinyl alcohol. As the cellulose fiber materials, cotton and other plant fibers such as linen, flax, hemp, jute and ramie fibers are preferred. As the regenerated cellulose fibers, viscose rayon staple and viscose rayon filament can be referred to.

The carbonamide group-containing material includes synthetic and natural polyamides and polyurethane. Particularly in the form of a fiber, it includes wool and other animal furs, silk, leather, polyamide-6,6, polyamide-6, polyamide-11 and polyamide-4.

The compound of the present invention can be used for dyeing or printing the above materials, especially the fiber materials in a manner depending on physical and chemical properties of the materials.

For example, exhaustion dyeing of the cellulose fibers can be carried out at a relatively low temperature in the presence of an acid binding agent such as sodium carbonate, sodium tertiary phosphate or sodium hydroxide, optionally with addition of a neutral salt such as sodium sulfate or sodium chloride and besides, dissolving assistants, penetrants or level dyeing agents. The neutral salt which promotes the exhaustion of the dye may be added only after reaching the intrinsic dyeing temperature or before reaching that temperature and if desired, may be added in portions.

When cellulose fibers are dyed by padding method, the fibers are padded at room or elevated temperature and dried and then subjected to steaming or dry-heating to perform dye-fixation.

Printing of cellulose fibers can be carried out in one-phase, by printing with a printing paste containing an acid binding agent such as sodium bicarbonate, followed by steaming at $95°-160°$ C. or in two-phase, by printing with a neutral or weakly acidic printing paste and passing the fibers through a hot alkaline bath containing an electrolyte or over-padding the fibers with an alkaline padding liquor containing an electrolyte, followed by steaming or dry-heating treatment.

For preparation of the printing paste, a paste or emulsifier such as sodium alginate or starch ether is used optionally together with a conventional printing assistant such as urea and/or a dispersant.

Examples of the acid binding agent suitable for fixing the compound of the present invention onto cellulose fibers are water-soluble basic salts formed between an alkali metal or an alkaline earth metal and an inorganic or organic acid or a compound liberating alkali in a heated state. Especially preferred are alkali metal hydroxides and alkali metal salts of inorganic or organic acids of weak or medium strength, among which sodium salts and potassium salts are preferred. Examples of such acid binding agent are sodium hydroxide, potassium hydroxide, sodium bicarbonate, sodium carbonate, sodium formate, potassium carbonate, sodium primary, secondary and tertiary phosphates, sodium silicate and sodium trichloroacetate.

Dyeing of synthetic and natural polyamide and polyurethane fibers can be carried out by performing exhaustion in an acidic or weakly acidic bath at a controlled pH value and then making the bath neutral or in some cases alkaline to perform fixation. The dyeing can be carried out normally at a temperature of 60°–120° C. In order to achieve a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is especially useful for dyeing cellulose fiber materials and gives a dyed product excellent in light fastness, perspiration-light fastness, wet fastnesses such as washing resistance, peroxide-washing resistance, perspiration resistance, acid hydrolysis resistance and alkali hydrolysis resistance, and besides, in abrasion fastness and iron fastness.

It is further characterized by excellency in build-up, level-dyeing and washing-off properties and high solubility as well as high exhaustion and fixation percentages. Moreover, it is characterized in that it is hardly affected by changes in dyeing temperature, the amounts of acid binding agents or neutral salts and dyeing bath ratio, so that a dyed product with a stable quality can be obtained.

Furthermore, the compound of the present invention is characterized in that it is resistant to color change at the time of fixing treatment and resin treatment of dyed product and resistant to the change due to contact with basic substances during storage.

The present invention will be explained in more detail by the following examples, in which parts and % are by weight.

Example 1

1-Amino-8-naphthol-3,6-disulfonic acid (31.9 parts) and cyanuric chloride (18.5 parts) were condensed under acidic condition in an aqueous medium by conventional process. Then, 2-aminonaphthalene-1-sulfonic acid (22.3 parts) was diazotized by conventional process and the diazotized product was coupled with said condensate to obtain the compound represented by the following formula in the free acid form:

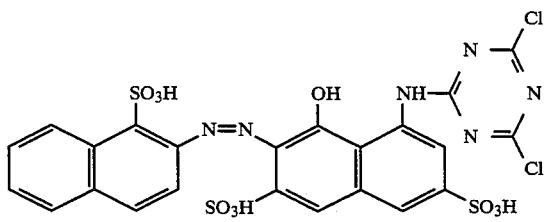

The resulting compound was condensed with morpholine (8.0 parts) at a temperature of 20°–30° C. under a pH of 7–8 and the resulting condensate was further condensed with 1-aminobenzene-3-$\beta$-sulfatoethylsulfon (28.1 parts) by conventional process. The thus obtained compound was subjected to salting-out with sodium chloride and isolated to obtain the monoazo compound represented by the following formula in the free acid form:

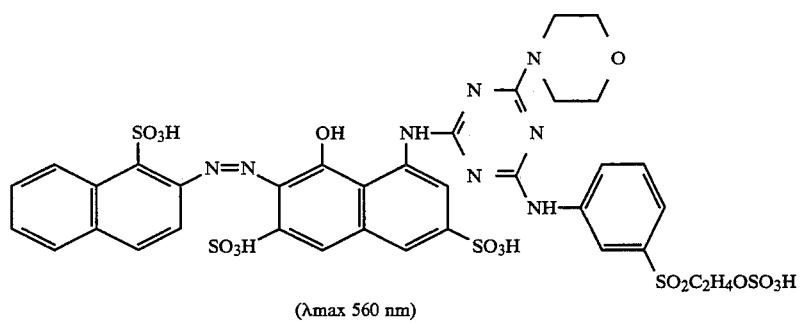

($\lambda$max 560 nm)

Example 2

Example 1 was repeated except that the compounds shown in Column 2, Column 3, Column 4 and Column 5 of the following table were used in place of 2-aminonaphthalene-1-sulfonic acid, 1-amino-8-naphthol-3,6-disulfonic acid, morpholine and 1-aminobenzene-3-$\beta$-sulfatoethylsulfone, respectively, thereby to obtain corresponding monoazo compounds. When used for dyeing, these compounds gave dyed products of which hues were as shown in column 6 of the table.

TABLE 1

| Column 1 | Column 2 | Column 3 | Column 4 | Column 5 | Column 6 |
|---|---|---|---|---|---|
| 1 | 2-aminonaphthalene-1-sulfonic acid (SO₃H, NH₂ on naphthalene) | 8-amino-1-hydroxynaphthalene-3,6-disulfonic acid (OH, NH₂, SO₃H, SO₃H on naphthalene) | morpholine (HN–O ring) | H₂N–C₆H₄–SO₂C₂H₄OSO₃H (para) | Bluish red |
| 2 | " | " | " | H₂N–C₆H₃(OCH₃)–SO₂C₂H₄OSO₃H | Bluish red |
| 3 | " | " | " | H₂N–C₆H₄–SO₂CH=CH₂ (meta) | Bluish red |
| 4 | " | " | " | HN(C₂H₅)–C₆H₄–SO₂C₂H₄OSO₃H | Bluish red |

TABLE 2

| Column 1 | Column 2 | Column 3 | Column 4 | Column 5 | Column 6 |
|---|---|---|---|---|---|
| 5 | 2-aminonaphthalene-1-sulfonic acid | 4-amino-5-hydroxynaphthalene-2,7-disulfonic acid (OH, NH₂, SO₃H, SO₃H) | morpholine | H₂N–C₆H₄–SO₂C₂H₄OSO₃H | Red |
| 6 | " | 4-amino-5-hydroxynaphthalene-2,7-disulfonic acid isomer (OH, NH₂, SO₃H, SO₃H) | " | H₂N–C₆H₂(OCH₃)(CH₃)–SO₂C₂H₄OSO₃H | Bluish red |
| 7 | " | " | " | H₂N–C₆H₂(OCH₃)(OCH₃)–SO₂C₂H₄OSO₃H | Bluish red |
| 8 | " | " | piperidine (HN ring) | H₂N–C₆H₄–SO₂C₂H₄OSO₃H | Bluish red |

TABLE 3

| Column 1 | Column 2 | Column 3 | Column 4 | Column 5 | Column 6 |
|---|---|---|---|---|---|
| 9 | 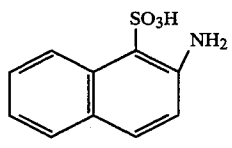 2-amino-naphthalene-1-sulfonic acid | 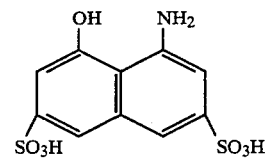 8-amino-1-hydroxy-naphthalene-3,6-disulfonic acid | 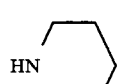 piperidine (HN) | 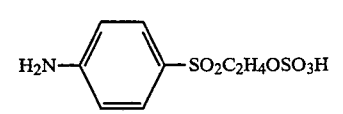 $H_2N$—C$_6$H$_4$—SO$_2$C$_2$H$_4$OSO$_3$H | Bluish red |
| 10 | " | " | " | 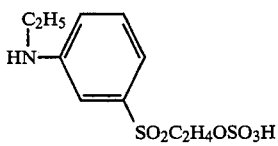 HN(C$_2$H$_5$)—C$_6$H$_4$—SO$_2$C$_2$H$_4$OSO$_3$H | Bluish red |
| 11 | " | " | " | 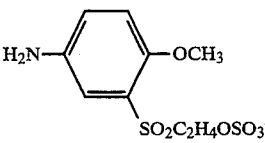 H$_2$N—C$_6$H$_3$(OCH$_3$)—SO$_2$C$_2$H$_4$OSO$_3$H | Bluish red |
| 12 | " | " | HN(C$_2$H$_5$)$_2$ |  H$_2$N—C$_6$H$_4$—SO$_2$C$_2$H$_4$OSO$_3$H | Bluish red |

TABLE 4

| Column 1 | Column 2 | Column 3 | Column 4 | Column 5 | Column 6 |
|---|---|---|---|---|---|
| 13 | 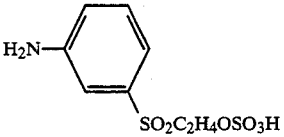 2-amino-naphthalene-1-sulfonic acid | 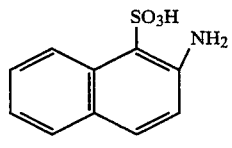 8-amino-1-hydroxy-naphthalene-3,6-disulfonic acid | H$_2$NCH$_2$CH$_2$CH$_3$ | 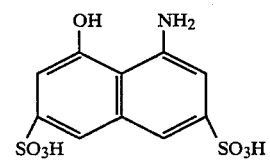 H$_2$N—C$_6$H$_4$—SO$_2$C$_2$H$_4$OSO$_3$H | Bluish red |
| 14 | " | " | H$_2$NC$_2$H$_4$OCH$_3$ | " | Bluish red |
| 15 | " | " | 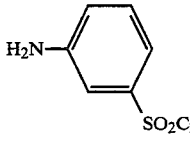 pyrrolidine (HN) | " | Bluish red |
| 16 | " | " | H$_2$NCH$_2$COOH |  H$_2$N—C$_6$H$_3$(Br)—SO$_2$C$_2$H$_4$Cl | Bluish red |
| 17 | " | " | 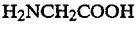 H$_2$N—C$_6$H$_{11}$ (cyclohexylamine) | 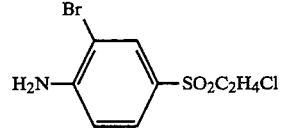 H$_2$N—C$_6$H$_3$(OCH$_3$)—SO$_2$C$_2$H$_4$OSO$_3$H | Bluish red |

TABLE 5

| Column 1 | Column 2 | Column 3 | Column 4 | Column 5 | Column 6 |
|---|---|---|---|---|---|
| 18 | 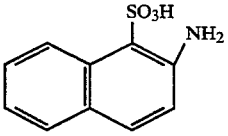 2-amino-1-naphthalenesulfonic acid | 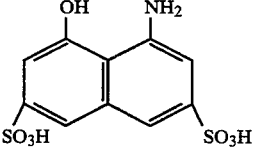 8-amino-1-hydroxy-3,6-naphthalenedisulfonic acid | $H_2NC_2H_4OC_2H_5$ | 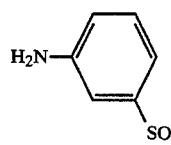 | Bluish red |
| 19 | " | " |  morpholine | 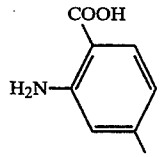 | Bluish red |
| 20 | " | " |  piperidine | 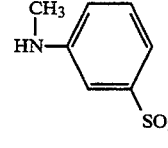 | Bluish red |
| 21 | 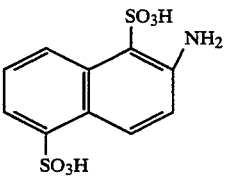 | 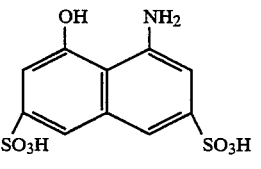 |  | 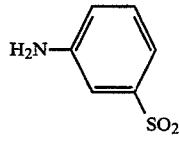 | Bluish red |

TABLE 6

| Column 1 | Column 2 | Column 3 | Column 4 | Column 5 | Column 6 |
|---|---|---|---|---|---|
| 22 | 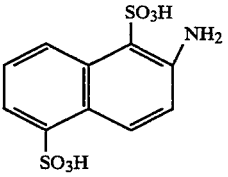 | 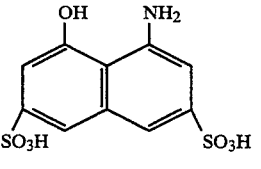 |  | 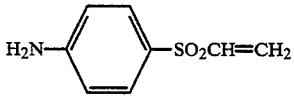 | Bluish red |
| 23 | " | " | " | 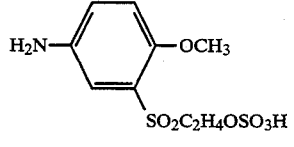 | Bluish red |
| 24 | " | " |  | 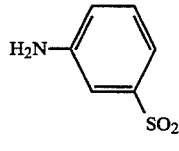 | Bluish red |
| 25 | " | " | $H_2NCH_2CH_2CH_3$ | " | Bluish red |

Dyeing Example 1

Each of the monoazo compounds obtained in Examples 1 and 2 (0.3 part) was dissolved in water (200 parts). After adding sodium sulfate (10 parts) and cotton (10 parts) thereto, the temperature was elevated to 50° C. Then, after elapse of 30 minutes, sodium carbonate (4 parts) was added and dyeing was carried out for 1 hour at that temperature. After completion of dyeing, the dyed cotton was washed with water and soaped to obtain red to bluish red colored dyed products high in density and excellent in fastnesses, especially chlorine fastness, light fastness and perspiration-light fastness and having excellent build-up property.

Dyeing Example 2

Each of the monoazo compounds obtained in Examples 1 and 2 (0.3 part) was dissolved in water (200 parts). After adding sodium sulfate (10 parts) and cotton (10 parts) thereto, the temperature was elevated to 60° C. Then, after elapse of 20 minutes, sodium carbonate (4 parts) was added and dyeing was carried out for 1 hour at that temperature. After completion of the dyeing, the dyed cotton was washed with water and soaped to obtain red to bluish red colored dyed products high in density and excellent in fastnesses, especially, light fastness and perspiration-light fastness and having excellent build-up property.

Dyeing Example 3

Composition of color paste

| Each of the monoazo compounds obtained in Examples 1 and 2 | 5 parts |
|---|---|
| Urea | 5 parts |
| Sodium alginate (5%) stock paste | 50 parts |
| Hot water | 25 parts |
| Sodium bicarbonate | 2 parts |
| Balance | 13 parts |

A mercerized cotton broad cloth was printed with the color paste having the above composition. After intermediate drying, it was steamed at 100° C. for 5 minutes, washed with hot water, soaped, washed with hot water and dried.

The dyed products thus obtained had red to bluish red color and were high in fixation percentage, excellent in fastnesses, especially light fastness and perspiration-light fastness and excellent in build-up property.

Dyeing Example 4

Each of the monoazo compounds obtained in Examples 1 and 2 (25 parts) was dissolved in hot water and cooled to 25° C. thereto were added 32.5% aqueous sodium hydroxide solution (5.5 parts) and water-glass of 50 Baumé degree (150 parts) and water was further added to make up the total amount to 1,000 parts at 25° C. Immediately thereafter, a cotton cloth was subjected to padding in the resultant liquor as a pad bath and taken up and was wrapped with a polyethylene film and stored in a room at 20° C.

A cotton cloth subjected to padding, taken up and wrapped with a polyethylene film in the same manner as above was stored in a room at 5° C. these padded cloths were left to stand for 20 hours and then the dyed products were washed with cold water and then hot water. Then, they were soaped in a boiling detergent, further washed with cold water and dried.

The dyed products left to stand at 20° C. for 20 hours and the dyed products left to stand at 5° C. for 20 hours were evaluated on differences in hue and density. Substantially no differences were recognized. Furthermore, dyed products of excellent build-up property were obtained by cold batch up dyeing.

Dyeing Example 5

Each of the monoazo compounds obtained in Examples 1 and 2 (25 parts) was dissolved in hot water and cooled to 25° C. Thereto were added 32.5% aqueous sodium hydroxide solution (10 parts) and anhydrous sodium sulfate (30 parts) and water was further added to make up the total amount to 1,000 parts at 25° C. Immediately thereafter, a viscose rayon cloth was subjected to padding in the resultant liquor as a pad bath and taken up and was wrapped with a polyethylene film and stored in a room at 20° C.

A viscose rayon cloth padded, taken up and wrapped with a polyethylene film in the same manner as above was stored in a room at 5° C.

These padded cloths were left to stand for 20 hours and then the dyed products were washed with cold water and then hot water. Then, they were soaped in a boiling detergent, further washed with cold water and dried.

The dyed products left to stand at 20° C. for 20 hours and the dyed products left to stand at 5° C. for 20 hours were evaluated on differences in hue and density. Substantially no differences were recognized.

Dyeing Example 6

Dyeing Example 2 was repeated except that sodium carbonate was used in an amount of 3 parts in place of 4 parts to obtain dyed products having the same quality as in Dyeing Example 2 with the respective monoazo compounds.

Dyeing Example 7

Dyeing Example 2 was repeated except that a temperature of 50° C. was employed in place of 60° C. to obtain dyed products having the same quality as in Dyeing Example 2 with the respective monoazo compounds. The same results were obtained when the temperature was 70° C.

Dyeing Example 8

Dyeing Example 2 was repeated except that sodium sulfate was used in an amount of 5 parts in place of 10 parts to obtain dyed products having the same quality as in Dyeing Example 2 with the respective monoazo compounds.

What is claimed is:

1. A monoazo compound represented by the following formula (I) in the free acid form:

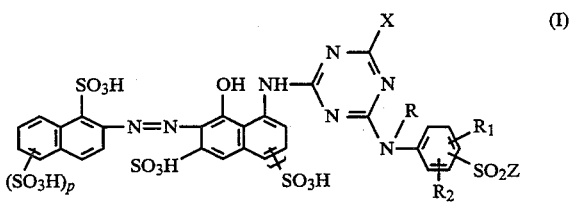

wherein X is an alkylamino, $C_5$-$C_7$ cycloalkylamino, piperidino, pyrrolidino or morpholino group which is unsubstituted or substituted with a substituent other than sulfo, R is hydrogen or unsubstituted or substituted $C_1$-$C_4$ alkyl, $R_1$ and $R_2$ independently of one another are each hydrogen, methoxy, ethoxy, methyl, ethyl, chloro, bromo, nitro, carboxy or sulfo, Z is vinyl or $-CH_2CH_2Y$ in which Y is a group which is split by the action of an alkali and p is 0 or 1.

2. A monoazo compound according to claim 1 which is represented by the following formula (II) in the free acid form:

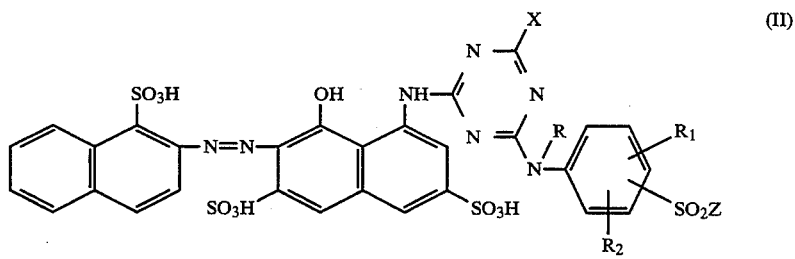

(II)

wherein X, R, R₁, R₂ and Z are as defined in claim 1.

3. A monoazo compound according to claim 1, wherein X is morpholino or piperidino.

4. A monoazo compound according to claim 1, wherein R is hydrogen, methyl or ethyl.

5. A monoazo compound according to claim 1, wherein Z is vinyl or sulfatoethyl.

6. A monoazo compound according to claim 1, wherein X is alkylamino having 1 to 4 carbon atoms and unsubstituted or substituted by hydroxy, C₁–C₄ alkoxy, chloro, bromo or carboxy, or X is C₅–C₇ cycloalkylamino, piperidino, pyrrolidino or morpholino, and R is hydrogen or C₁–C₄ alkyl unsubstituted or substituted by hydroxy, cyano, alkoxy, halogen, carbamoyl, carboxy, alkoxycarbonyl, alkylcarbonyloxy, sulfo or sulfamoyl.

7. A method of dyeing or printing fiber materials by applying thereto the monoazo compound according to claim 1.

8. Fiber materials dyed or printed by the method of claim 1.

* * * * *